US009881003B2

United States Patent
Hartrell et al.

(10) Patent No.: US 9,881,003 B2
(45) Date of Patent: Jan. 30, 2018

(54) AUTOMATIC TRANSLATION OF DIGITAL GRAPHIC NOVELS

(71) Applicant: Google Inc., Mountain View, CA (US)

(72) Inventors: Greg Don Hartrell, Pleasanton, CA (US); Debajit Ghosh, Menlo Park, CA (US); Matthew William Vaughan-Vail, San Mateo, CA (US); John Michael Rivlin, Palo Alto, CA (US); Garth Conboy, La Jolla, CA (US); Xinxing Gu, San Jose, CA (US); Alexander Toshkov Toshev, San Francisco, CA (US)

(73) Assignee: Google LLC, Mountain View, CA (US)

( * ) Notice: Subject to any disclaimer, the term of this patent is extended or adjusted under 35 U.S.C. 154(b) by 18 days.

(21) Appl. No.: 14/863,394

(22) Filed: Sep. 23, 2015

(65) Prior Publication Data
US 2017/0083511 A1    Mar. 23, 2017

(51) Int. Cl.
*G06F 17/00*    (2006.01)
*G09G 5/00*    (2006.01)
*G06F 17/28*    (2006.01)
*G06F 17/24*    (2006.01)
*G06F 17/21*    (2006.01)
*G06F 17/22*    (2006.01)
*G06N 3/02*    (2006.01)
(Continued)

(52) U.S. Cl.
CPC ........ *G06F 17/2836* (2013.01); *G06F 17/212* (2013.01); *G06F 17/2229* (2013.01); *G06F 17/243* (2013.01); *G06F 17/289* (2013.01); *G06K 9/00476* (2013.01); *G06K 9/726* (2013.01); *G06N 3/02* (2013.01)

(58) Field of Classification Search
CPC combination set(s) only.
See application file for complete search history.

(56) References Cited

U.S. PATENT DOCUMENTS 5,369,716 A  *  11/1994  Sangu ................ G06K 9/00463
                                                                                    382/282
6,275,789 B1 *   8/2001  Moser ................... G06F 17/271
                                                                                    704/2
(Continued)

FOREIGN PATENT DOCUMENTS

EP        2711848 A2        3/2014
JP      2007164550 A        6/2007
(Continued)

OTHER PUBLICATIONS

Conboy, G., et al., "EPUB Region-Based Navigation 1.0," International Digital Publishing Forum, Aug. 26, 2015, 33 Pages, [online][Retrieved on Sep. 23, 2015] Retrieved from the internet <URL:http://www.idpf.org/epub/renditions/region-nav/>.
(Continued)

*Primary Examiner* — Fariba Sirjani
(74) *Attorney, Agent, or Firm* — Shumaker & Sieffert, P.A.

(57) ABSTRACT

Digital graphic novel content is received and features of the graphic novel content are identified. At least one of the identified features includes text. Contextual information corresponding to the feature or features that include text is generated based on the identified features. The contextual information is used to aid translation of the text included in the feature or features that include text.

19 Claims, 8 Drawing Sheets

(51) Int. Cl.
*G06K 9/00* (2006.01)
*G06K 9/72* (2006.01)

(56) References Cited

U.S. PATENT DOCUMENTS

| | | | |
|---|---|---|---|
| 7,020,601 B1* | 3/2006 | Hummel | G06F 17/278 |
| | | | 704/1 |
| 7,528,986 B2* | 5/2009 | Kato | G06K 9/00463 |
| | | | 358/1.16 |
| 8,301,999 B2 | 10/2012 | Olson | |
| 2001/0032217 A1* | 10/2001 | Huang | G06F 17/218 |
| | | | 715/239 |
| 2002/0007265 A1* | 1/2002 | Yamada | G06F 9/4448 |
| | | | 704/3 |
| 2003/0065499 A1* | 4/2003 | Carter | G06F 17/289 |
| | | | 704/1 |
| 2005/0171758 A1* | 8/2005 | Palmquist | G06F 17/28 |
| | | | 704/4 |
| 2006/0217954 A1* | 9/2006 | Koyama | G06F 17/289 |
| | | | 704/2 |
| 2006/0217956 A1* | 9/2006 | Nagao | G06F 17/241 |
| | | | 704/2 |
| 2006/0271847 A1* | 11/2006 | Meunier | G06K 9/00469 |
| | | | 715/205 |
| 2007/0250509 A1* | 10/2007 | Marti | G06F 17/241 |
| 2007/0250528 A1* | 10/2007 | Ahs | G06F 17/241 |
| 2007/0294614 A1* | 12/2007 | Jacquin | G06F 17/2247 |
| | | | 715/230 |
| 2008/0059481 A1 | 3/2008 | Kunimatsu et al. | |
| 2008/0172637 A1* | 7/2008 | Chang | G06F 17/289 |
| | | | 715/846 |
| 2008/0273796 A1* | 11/2008 | Kansal | G06K 9/325 |
| | | | 382/176 |
| 2008/0301578 A1 | 12/2008 | Olson | |
| 2009/0324134 A1* | 12/2009 | Howell | G06F 17/30905 |
| | | | 382/284 |
| 2010/0118037 A1* | 5/2010 | Sheikh | G06T 13/80 |
| | | | 345/473 |
| 2010/0138775 A1* | 6/2010 | Kohen | G06F 9/4443 |
| | | | 715/781 |
| 2010/0275152 A1* | 10/2010 | Atkins | G06F 17/212 |
| | | | 715/788 |
| 2010/0315315 A1 | 12/2010 | Osborne | |
| 2010/0318895 A1 | 12/2010 | Steinberger et al. | |
| 2011/0074831 A1 | 3/2011 | Lynch et al. | |
| 2011/0251837 A1* | 10/2011 | Conboy | G06F 17/2735 |
| | | | 704/8 |
| 2011/0261030 A1 | 10/2011 | Bullock | |
| 2012/0131487 A1* | 5/2012 | Leonard | G06F 17/211 |
| | | | 715/771 |
| 2013/0124185 A1 | 5/2013 | Amadou et al. | |
| 2013/0166276 A1* | 6/2013 | Raichelgauz | G06F 17/28 |
| | | | 704/2 |
| 2013/0282376 A1* | 10/2013 | Nonaka | G06F 17/289 |
| | | | 704/260 |
| 2013/0283157 A1* | 10/2013 | Ebata | G06T 11/60 |
| | | | 715/265 |
| 2014/0074648 A1 | 3/2014 | Morton et al. | |
| 2014/0122054 A1* | 5/2014 | Takano | G06F 17/2809 |
| | | | 704/2 |
| 2014/0229158 A1* | 8/2014 | Zweig | G06N 3/04 |
| | | | 704/9 |
| 2014/0258911 A1 | 9/2014 | Pallakoff et al. | |
| 2014/0359495 A1* | 12/2014 | Bartley | G06F 8/40 |
| | | | 715/762 |
| 2015/0121202 A1* | 4/2015 | Saund | G06F 17/211 |
| | | | 715/249 |
| 2015/0134323 A1 | 5/2015 | Cuthbert et al. | |
| 2015/0227509 A1* | 8/2015 | Landau | G06F 17/289 |
| | | | 704/2 |

FOREIGN PATENT DOCUMENTS

| | | |
|---|---|---|
| JP | 2007226255 A | 9/2007 |
| WO | WO 2007/091081 A2 | 8/2007 |

OTHER PUBLICATIONS

CYO Soft, "ComicRack—Download," 2009-2015, 3 Pages, [online] [retrieved on Nov. 9, 2015] Retrieved from the internet <URL: http://comicrack.cyolito.com/downloads/comicrack/func-startdown/131/>.

CYO Soft, "The ComicRack™ Manual," 5$^{th}$ Edition, 600Wpmpo, cYo Soft Publishing, Jul. 2011, 179 Pages, [online] [retrieved on Nov. 9, 2015] Retrieved from the internet <URL:https://dl.dropboxusercontent.com/u/2496412/ComicRack%20Manual%20%285th%20ed%29.pdf>.

Google Sites, "Comic Translation Tool (Win)—Orepmetiur Software," 2 Pages, [online] [retrieved on Nov. 9, 2015] Retrieved from the internet <URL:https://sites.google.com/site/orepmetiur/comic-translation-tool>.

Henry, A., "Five Best Desktop Comic Book Readers," Life Hacker, Dec. 28, 2014, 11 Pages, [online] [retrieved on Nov. 9, 2015] Retrieved from the internet <URL:http://lifehacker.com/5858906/five-best-desktop-comic-book-readers>.

WebPage for CBRReader.com, 2011, 1 Page, [online] [retrieved on Nov. 9, 2015] Retrieved from the internet <URL:http://www.cbr-reader.com/>.

WebPage for CBRReader.com, retrieved from http://www.cbr-reader.com/, 2011, 1 pp. (Applicant points out, in accordance with MPEP 609.04(a), that the year of publication, 2011, is sufficiently earlier than the effective U.S. filing date, Sep. 23, 2015, so that the particular month of publication is not in issue.).

PCT International Search Report and Written Opinion for PCT/US2016/046200, Oct. 19, 2016, 9 Pages.

PCT International Search Report and Written Opinion for PCT/US2016/046202, Dec. 6, 2016, 15 Pages.

Bernhaupt, R., et al., "Using artificial neural networks as an image segmentation module of an OCR-system: a preliminary study," Proceedings of the 5th WSES International Conference on Circuits, Systems, Communications and Computers, Jul. 8, 2001, 6 Pages, can be retrieved at <URL:http://www.wseas.us/e-library/conferences/crete2001/papers/675.pdf>.

Budikova, P., "Neural networks in modern image processing," DISA Seminar, Sep. 30, 2014, 22 Pages, Can be retrieved at <URL:http://is.muni.cz/el/1433/podzim2014/PV253/um/NeuralNetworks.pdf>.

Han, E.-J, et al., "Efficient page layout analysis on small devices," Journal of Zhejiang University Science A, 2009, pp. 800-804, vol. 10, No. 6.

Mogmo Inc., "Comics translation service," Internet archive record of Mogmo's webpage, Nov. 3, 2012, 3 Pages, [online] [retrieved on May 20, 2016] Retrieved from the Internet: <URL:https://web.archive.org/web/20121103212228/http://mogmo.com/solutions/publishers/translation/>.

Rigaud, C., et al., "Knowledge-driven understanding of images in comic books," International Journal on Document Analysis and Recognition, Apr. 9, 2015, pp. 199-221, vol. 18, No. 3.

Williams, R., et al., "A Learning Algorithm for Continually Running Fully Recurrent Neural Networks," Neural Computation, 1989, pp. 270-280, vol. 1.

Xiao, T., et al., "Error-Driven Incremental Learning in Deep Convolutional Neural Network for Large-Scale Image Classification," Multimedia, Nov. 3-7, 2014, pp. 177-186, ACM.

* cited by examiner

AUTOMATIC TRANSLATION OF DIGITAL GRAPHIC NOVELS

BACKGROUND

1. Technical Field

The subject matter described herein generally relates to digital graphic novels, and in particular to providing automatic translation of digital graphic novel content.

2. Background Information

Electronic books ("ebooks") come in a variety of formats, such as the International Digital Publishing Forum's electronic publication (EPUB) standard and the Portable Document Format (PDF). Ebooks can be read using a variety of devices, such as dedicated reading devices, general-purpose mobile devices, tablet computers, laptop computers, and desktop computers. Each device includes reading software (an "ereader") that displays an ebook to a user.

Graphic novels are a form of visual storytelling traditionally delivered through print media. However, publishers are increasingly providing this content for digital consumption using ereaders, especially on phones and tablets. Such digital graphic novel content is available in a wide range of jurisdictions and there is demand for graphic novels in many languages. Typically, providing translated versions of graphic novels requires altering the underlying images. Consequently, bootleggers often make unlicensed translations available before publishers and authors can get official translated version to market.

SUMMARY

The above and other problems are addressed by a method, an electronic device, and a non-transitory computer-readable storage medium. In one embodiment, the method includes receiving digital graphic novel content and identifying features of the graphic novel content. The features include at least one feature that includes text. The method also includes generating contextual information corresponding to the at least one feature that includes text based on the identified features. The method further includes translating the text included in the at least one feature to produce translated text, the translating aided by the contextual information.

In one embodiment, the electronic device includes a non-transitory computer-readable storage medium storing executable computer program code and one or more processors for executing the code. The executable computer program code includes instructions for receiving digital graphic novel content and identifying features of the graphic novel content. The features include at least one feature that includes text. The executable computer program code also includes instructions for generating contextual information corresponding to the at least one feature that includes text based on the identified features. The executable computer program code further includes instructions for translating the text included in the at least one feature to produce translated text, the translating aided by the contextual information.

In one embodiment, the non-transitory computer-readable storage medium stores executable computer program code. The executable computer program code includes instructions for receiving digital graphic novel content and identifying features of the graphic novel content. The features include at least one feature that includes text. The executable computer program code also includes instructions for generating contextual information corresponding to the at least one feature that includes text based on the identified features. The executable computer program code further includes instructions for translating the text included in the at least one feature to produce translated text, the translating aided by the contextual information.

DETAILED DESCRIPTION

Publishers are making an increasing volume of graphic novel content available digitally. There is also a vast print corpus of graphic novels, comic books, and comic strips dating back to the 19$^{th}$ Century. Some historians have even argued that artworks produced by ancient civilizations such as Trajan's Column in Rome and the Bayeux Tapestry are essentially the same art form. For convenience, the term graphic novel is used herein to refer to any such content that comprises a series of ordered images with a narrative flow.

Reading graphic novels is different from reading text-based books. Rather than telling a story primarily through text read in a locale specific reading order (e.g., from left-to-right and top-to-bottom in English-speaking countries), the narrative of a graphic novel is conveyed through a combination of ordered images (also referred to as panels) and speech bubbles. In some cases, speech bubbles overlap multiple panels. Furthermore, in some instances (e.g., many Japanese graphic novels), the text is read from right-to-left and top-to-bottom. These factors present specific challenges when providing automatic (or semi-automatic) translations of graphic novels. The context of a word or phrase is often important in providing an accurate translation. Thus, knowing the intended order of panels and speech bubbles can aid in the production of high-quality translations because it enables analysis of dialogue in the correct order. Furthermore, other features of the images in a graphic novel may provide additional contextual information to aid translation. Where a word or phrase has two (or more) possible translations, the presence of particular characters or objects in the corresponding image may increase the likelihood of one translation over the other. For example, the English word "bow" can be a type of knot, a weapon, a physical act, or part of a boat. If the image in which the word is included depicts one of those things then that is likely the correct translation.

System Overview

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
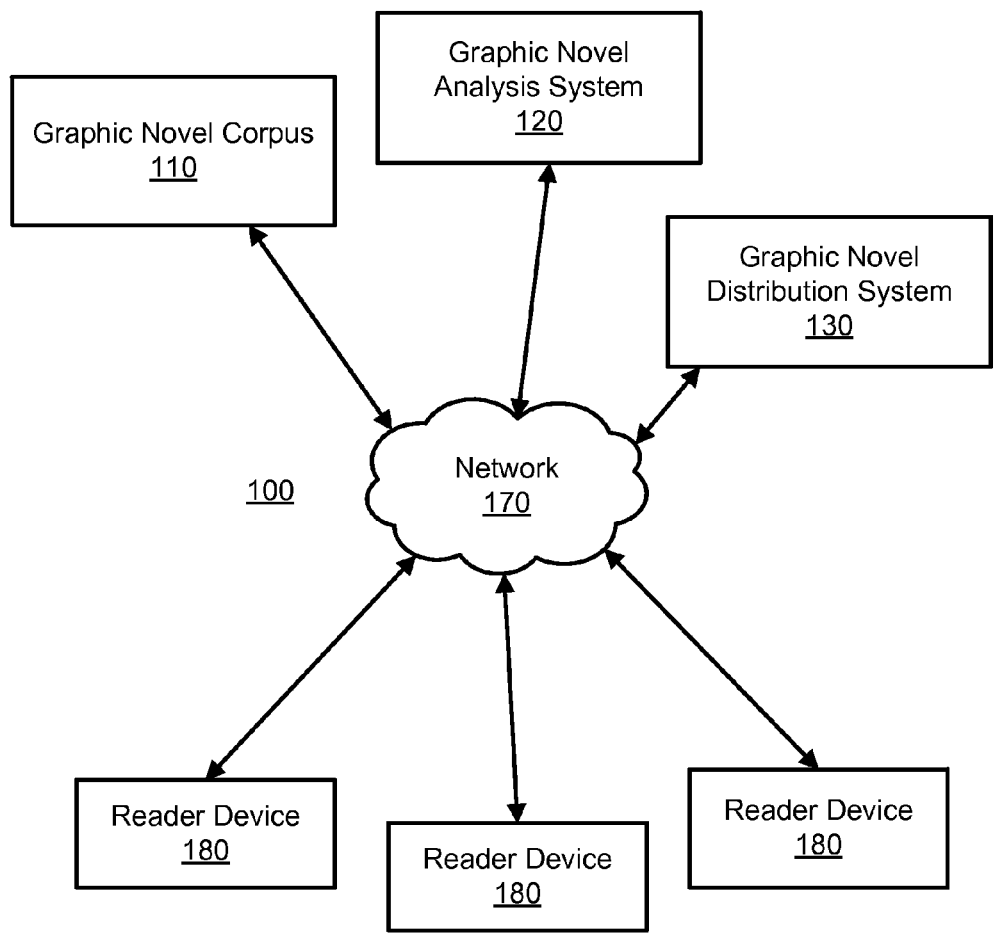
FIG. 1 is a high-level block diagram illustrating a networked computing environment suitable for providing graphic novels with computer-aided navigation, according to one embodiment.

FIG. 1 illustrates one embodiment of a networked computing environment 100 suitable for providing automatic (or semi-automatic) translation of digital graphic novels. As shown, the environment 100 includes a graphic novel corpus 110, a graphic novel analysis system 120, a graphic novel distribution system 130, and reader devices 180, all connected via a network 170. Other embodiments of the networked computing environment 100 include different or additional components. In addition, the functions may be distributed among the components in a different manner than described herein.

The graphic novel corpus 110 stores digital representations of graphic novels. The digital representations can use any appropriate format, such as EPUB or PDF. In various embodiments, the digital representations are provided premade by publishers and authors, created by scanning existing printed graphic novels, or compiled using a combination of these techniques. The graphic novel corpus 110 is described in detail below, with reference to FIG. 3.

The graphic novel analysis system 120 applies machine-learning techniques to build and apply a model for identifying features within a digital graphic novel. The graphic novel analysis system 120 also provides translations of identified features that include text. In one embodiment, the features include the locations and intended reading order of panels and speech bubbles. The intended order is used to aid translation of identified text by providing greater context for that text. In other embodiments, the features additionally or alternately include: depicted characters, depicted objects (e.g., doors, weapons, etc.), events (e.g., plots, inter-character relationships, etc.), moods, desired visual transitions between one panel and the next (e.g., pan, zoom out and zoom back in, etc.), depicted weather, genre, right-to-left (RTL) reading, advertisements, and the like. Many of these features are distinct to graphic novels. For example, text-based books have authors, but do not have artists, and identifying characters or objects depicted in the images of a graphic novel content is very different from identifying the same things in text. Similarly, pages in text-based books are read left-to-right and top-to-bottom, whereas graphic novels typically contain several panels per page that are read sequentially, and several speech bubbles per panel, with the intended reading order requiring the reader's attention to jump around the page.

In some instances, the graphic novel analysis system 120 uses the identification of certain features of a digital graphic novel to assist in the translation of text. For example, in one embodiment, if the graphic novel analysis system 120 identifies a particular character in a panel, it applies a machine-translation algorithm designed for that character. This character specific algorithm can include a list of common phrases associated with the character along with prepared translations of those phrases. The machine-translation algorithm might also be machine-learnt and be developed from a training set of just dialogue associated with that character. The graphic novel analysis system 120 is described in detail below, with reference to FIG. 4.

The graphic novel distribution system 130 creates packaged digital graphic novels that include graphic novel content and presentation metadata indicating how the graphic novel content should be presented. In one set of embodiments, the graphic novel distribution system 130 translates the graphic novel content as part of the packaging process. In one such embodiment, the presentation metadata includes the identified features, identified feature locations, and the intended reading order of panels/speech bubbles as outputted by the graphic novel analysis system 120. In another such embodiment, the graphic novel distribution system 130 processes the output from the graphic novel analysis system 120 to determine a recommended presentation manner. In this embodiment, the presentation metadata includes an ordered list of presentation instructions (e.g., display panel one full screen, then pan to panel two and zoom in on speech bubble one, then zoom out to display panel two full screen, then zoom in on speech bubble two, etc.).

In another set of embodiments, the presentation metadata includes metadata to assist translation by another device (e.g., a reader device 180). In one such embodiment, the presentation metadata includes the identified features, identified feature locations, and the intended reading order of panels/speech bubbles, and a plaintext representation of the content of each speech bubble, as outputted by the graphic novel analysis system 120. In another such embodiment, the presentation metadata also includes a location and plaintext representation of text included in the graphic novel content that is not within a speech bubble (e.g., text on signs, visual emotes of sound effects, and the like). The graphic novel distribution system 130 is described in detail below, with reference to FIG. 5.

The reader devices 180 can be any computing device capable of presenting a digital graphic novel to a user, such as desktop PCs, laptops, smartphones, tablets, dedicated reading devices, and the like. Although only three reader devices 180 are shown, in practice there are many (e.g., millions of) reader devices 180 that can communicate with the other components of the environment 100 using the network 170. In one embodiment, a client device 180 receives a packaged digital graphic novel from the graphic novel distribution system 130 and presents it to a user in accordance with the included presentation metadata. An exemplary reader device 180 is described in detail below, with reference to FIG. 6.

The network 170 enables the components of the networked computing environment 100 to communicate with each other. In one embodiment, the network 170 uses standard communications technologies and/or protocols and can include the Internet. Thus, the network 170 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 170 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), Portable Document Format (PDF), Electronic Publication (EPUB), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 170 can use custom and/or dedicated data communications technologies instead of, or in addition to, the ones described above.

Figure 2:
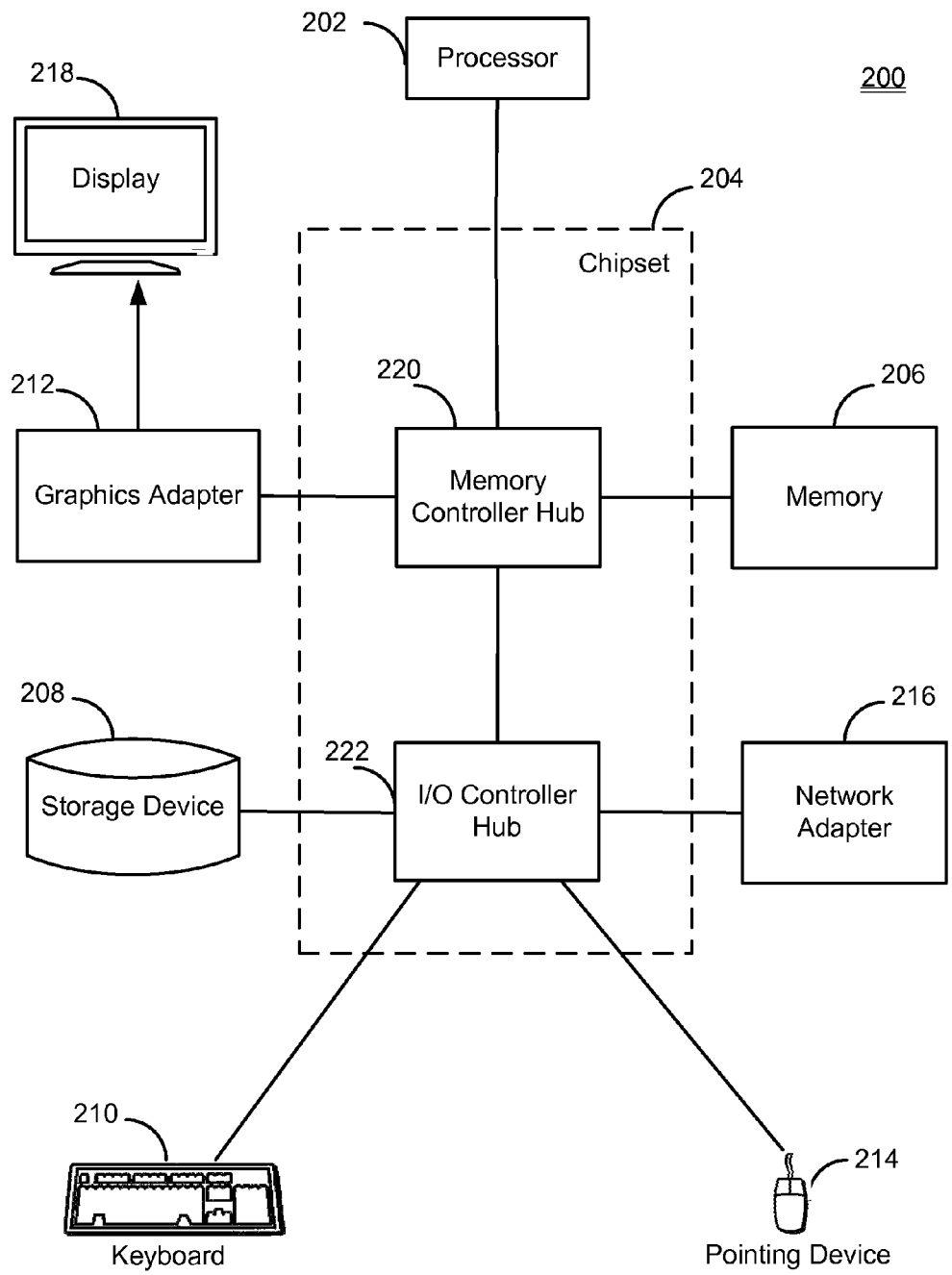
FIG. 2 is a high-level block diagram illustrating an example of a computer for use in the networked computing environment of FIG. 1, according to one embodiment.

FIG. 2 is a high-level block diagram illustrating one embodiment of a computer 200 suitable for use in the networked computing environment 100. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different or additional components than those shown in FIG. 2. For example, the graphic novel analysis system 120 can be formed of multiple computers 200 operating together to provide the functions described herein. As another example, the client device 180 can be a smartphone and include a touch-screen that provides on-screen keyboard 210 and pointing device 214 functionality.

The computer 200 is adapted to execute computer program modules for providing functionality described herein. As used herein, the term "module" refers to computer program instructions or other logic used to provide the specified functionality. Thus, a module can be implemented in hardware, firmware, or software, or a combination thereof. In one embodiment, program modules formed of executable computer program instructions are stored on the storage device 208, loaded into the memory 206, and executed by the processor 202.

Exemplary Systems

Figure 3:
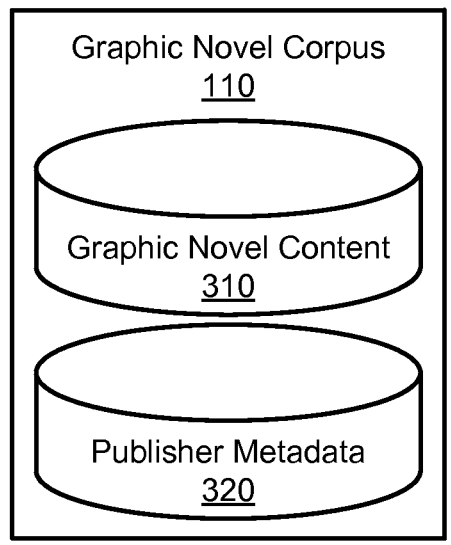
FIG. 3 is a high-level block diagram illustrating one embodiment of the graphic novel corpus shown in FIG. 1.

FIG. 3 illustrates one embodiment of the graphic novel corpus 110. As shown, the graphic novel corpus 110 includes graphic novel content 310 and publisher metadata 320. Other embodiments of the graphic novel corpus 110 include different or additional components. For example, although graphic novel content 310 and publisher metadata 320 are shown as distinct entities, a single data store may be used for both the content and metadata.

The graphic novel content 310 includes images of the pages of graphic novels in the corpus 110, and is stored on one or more non-transitory computer-readable storage media. As described previously, the graphic novel content 310 can be provided directly by publishers and authors or obtained by scanning existing printed graphic novels. In one embodiment, the graphic novel content 310 includes PDF documents of complete graphic novels, with each page of the PDF including an image of a page of the graphic novel. Alternatively, each page of the PDF may include more or less than a page in the graphic novel, such as a single panel or a two-page spread. In another embodiment, the graphic novel content 310 is stored as fixed layout EPUB files. One of skill in the art will appreciate other formats in which graphic novel content 310 can be stored.

The publisher metadata 320 is metadata provided by graphic novel publishers or authors that includes information about the graphic novel, such as title, publication date, author, artist, publisher, series, main characters, and the like. In embodiments where the graphic novel content 320 is generated by scanning existing printed graphic novels, there may be no publisher metadata. Alternatively, the individual or entity that scans the printed graphic novel can provide publisher metadata 320 (e.g., by typing it into an electronic form as part of the scanning process).

Figure 4:
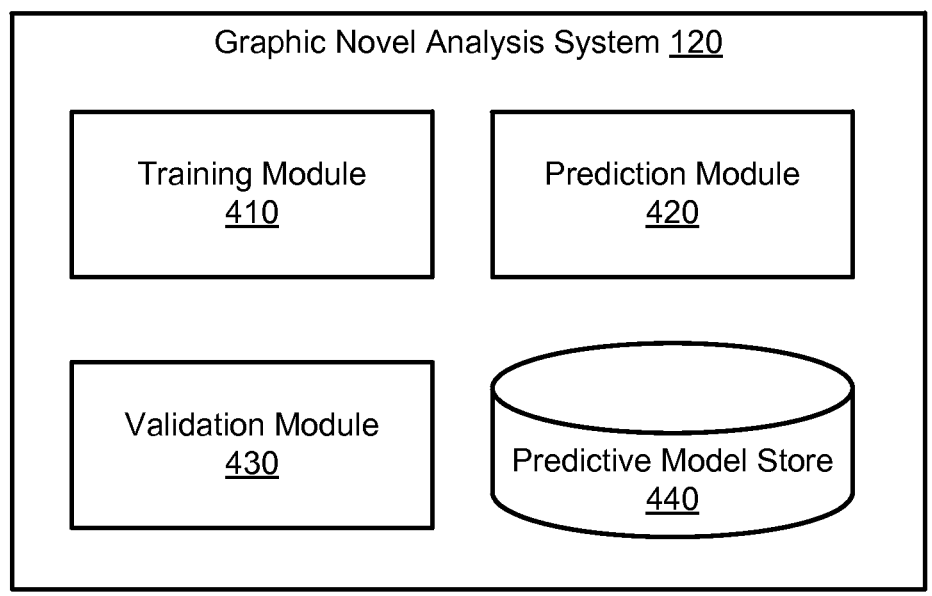
FIG. 4 is a high-level block diagram illustrating one embodiment of the graphic novel analysis system shown in FIG. 1.

FIG. 4 illustrates one embodiment of the graphic novel analysis system 120. As shown, the graphic novel analysis system 120 includes a training module 410, a prediction module 420, a validation module 430, and a predictive model store 440. Other embodiments of the graphic novel analysis system 120 include different or additional components. In addition, the functions may be distributed among the components in a different manner than described herein. For example, the graphic novel analysis system 120 might not include a predictive model store 440, instead storing predictive models in the graphic novel corpus 110. As another example, in embodiments that use crowd-sourced feedback, some or all of the functionality attributed to the validation module 430 may be provided by the feedback modules 620 of user devices 180.

The training module 410 builds a machine-learning model from a training set of graphic novels. When applied to digital graphic novel content, the model predicts features that are included therein. In one embodiment, the training module 410 selects a subset of digital graphic novels from the corpus 110 randomly to use as the training set. In other embodiments, the subset is based on publisher metadata 320. For example, the training module 410 may select the subset to include a range of values for one or more features (e.g., artists, publishers, characters, etc.) to increase the probability that the initial model will accurately identify those features in an unknown graphic novel. In one such embodiment, publisher metadata is used to identify digital publications that are graphic novels, a set of those graphic novels that are popular is identified (e.g., based on number of downloads), the set is split into two groups based on whether they include right-to-left reading (e.g., based on publisher metadata), and the subset is populated by randomly selecting some graphic novels from each group. In a further embodiment, the training set is selected manually and provided to the training module 410. In yet another embodiment, the training data is crowd-sourced from participating users, and thus the training set is those digital graphic novels from the corpus 110 that participating users choose to read.

The training module 410 prepares the training set for use in a supervised training phase. In one embodiment, the training module 410 extracts raw images (e.g., corresponding to individual pages) from the digital graphic novels in the training set. In other embodiments, the training module 410 performs image processing. In one such embodiment, the training module 410 determines the dimensions of each raw image and applies a resizing operation such that each image in the training set if of a uniform size. The training module 410 also determines if the image is tilted (e.g., due to an error during scanning) and applies tilt-correction as required. In other embodiments, additional or different image processing is applied to the raw images, such as applying an auto-contrast function, normalizing to a uniform average brightness, performing automatic color balancing, and the like.

However the training set is prepared, the training module 410 uses it to build an initial feature-identification model. In one set of embodiments, the training module 410 builds the initial model in a supervised training phase. In one such embodiment, human operators are shown images of graphic novel pages and prompted to indicate the location and order of the panels and speech bubbles. For example, an operator might trace the perimeter of each panel with a pointing device in order, select a button to move onto the speech bubble, and sequentially trace the perimeter of each speech bubble. In another embodiment, the operators are also asked to select other features included in the images from a closed set (e.g., instances of non-speech bubble text, a list of characters that might be depicted, and the like). In a further embodiment, the operators can provide tags using freeform text. In yet another embodiment (e.g., where crowd-sourcing is used), the operators merely read digital graphic novels as they would using a conventional reader. The operators read the graphic novel using navigation commands such as scroll, zoom, and page turn, and the training module 410 records the navigation commands issued by the operators. By aggregating the navigation choices made by multiple operators while reading the same graphic novel, the training module 410 can build a predictive model for how a future reader would prefer the content to be presented. Regardless of the precise methodology used, the result is a series of images paired with metadata indicating the human-identified features.

In another set of embodiments, some or all of the initial model is built from publisher metadata. In one such embodiment, the training set includes digital graphic novels that already include publisher metadata identifying certain features, such as depicted characters, author, artist, intended reading order of panels and speech bubbles, and the like. Thus, the training module 410 can build a model from the publisher metadata that can be applied to digital graphic novels that do not include publisher metadata identifying the features of interest, such as those produced by scanning printed graphic novels.

The training module 410 builds the initial model from the series of images and paired metadata. In some embodiments, the model is an artificial neural network made up of a set of nodes in one or more layers. Each node is configured to predict whether a given feature is present in an input image, with nodes in each layer corresponding to lower-levels of abstraction than nodes in the preceding layer. For example, a node in the first layer might determine whether the input image corresponds to one or two pages, a node in the second layer might identify the panels in each page, and a node in the third layer might identify the speech bubbles in each panel. Similarly, a first-layer node might determine the presence of a character, a second-layer node might determine the identity of the character, and a third-layer node might determine the particular era of that character (e.g., before or after a particularly important event in the character's arc). In one embodiment, the publisher metadata is also used in building the model. For example, the presence of a particular hero makes it more likely for that hero's nemesis to be present rather than a different villain typically seen in a different publisher's graphic novels. In other embodiments, other types of model are used, such as graphical models. One of skill in the art may recognize other types of model that can be built from a series of images and paired metadata to predict features of other images.

In one embodiment, the training module 410 builds the initial model using a two-stage process. In the first stage, the input image is passed through a neural network that identifies a fixed number of regions (e.g., one hundred) in the image that are candidates for including features of interest. In the second stage, the identified regions are passed through a second neural network that generates a prediction of the identity of the feature of interest and a corresponding probability that the prediction is correct. The training module 410 then calculates the cost of transforming the predicted feature set into the human-identified feature set for the input image.

To update the model, the training module 410 applies a backpropagation algorithm based on the calculated transformation cost. The algorithm propagates the cost information through the neural network and adjusts node weightings to reduce the cost associated with a future attempt to identify the features of the input image. For example, if the human-provided features included that a particular character is present in the image, and the neural network predicted that character to be present with eighty percent certainty, the difference (or error) is twenty percent. In one embodiment, the training module 410 applies a gradient descent method to iteratively adjust the weightings applied to each node such that the cost is minimized. The weighting of a node is adjusted by a small amount and the resulting reduction (or increase) in the transformation cost is used to calculate the gradient of the cost function (i.e., the rate at which the cost changes with respect to the weighting of the node). The training module 410 then further adjusts the weighting of the node in the direction indicated by the gradient until a local minimum is found (indicated by an inflection point in the cost function where the gradient changes direction). In other words, the node weightings are adjusted such that the neural network learns to generate more accurate predictions over time.

The prediction module 420 applies the machine-learning model to untrained images from the graphic novel corpus 110 that were not part of the training set. The machine-learning model generates a prediction of the features included in the untrained images. In one embodiment, an untrained image is converted into a numerical mapping. The numerical mapping include a series of integer values that each represent a property of the image. For example, integers in the map might represent the predominance of various colors, an average frequency with which color changes in the vertical or horizontal direction, an average brightness, and the like. In another embodiment, the mapping includes real values that represent continuous quantities, such as the coordinates of an object in the image, a probability, and the like. One of skill in the art will recognize various ways in which an image can be converted into numerical mapping.

In one embodiment, the prediction module 420 provides the numerical mapping as input to the neural network. Starting at the first layer, nodes receive input data based on the input image (e.g., the numerical map or a portion thereof). Each node analyzes the input data it receives and determines whether the feature it detects is likely present in the input image. On determining the feature is present, the node activates. An activated node modifies the input data based on the activated nodes weighting and sends the modified input data to one or more nodes in the next layer of the neural network. If an end node in the neural network is activated, the neural network outputs a prediction that the feature corresponding to that end node is present in the input image. In one embodiment, the predictions is assigned a percentage likelihood that it is correct based on the weightings assigned to each node along the path taken through the neural network.

The prediction module 420 also extracts the text from identified features predicted to include text. In one embodiment, the prediction module 420 applies an optical character recognition (OCR) algorithm to each speech bubble to convert the illustrated text therein into machine-readable form. Given the predicted order of the panels and speech bubbles, the prediction module 420 (or another entity, such as the graphic novel distribution system 130) can arrange the machine-readable text in the predicted intended reading order. In another embodiment, the prediction module 420 also applies an OCR algorithm to non-speech bubble text included in the panels. Non-speech bubble text is often highly stylized (e.g., graffiti, action emotes, etc.) and/or distorted by perspective effects (e.g., text on the side of an object that is at an acute angle relative to the "camera"). The prediction module 420 may apply additional image processing prior to applying the OCR algorithm, such as estimating and accounting for skew due to perspective effects. Furthermore, the context of a panel (e.g., depicted objects and characters) can be used by the OCR algorithm to improve accuracy. For example, a depicted character's catchphrase is more likely to be present than a slight variation on that catchphrase. As another example, actions depicted in the panels can be used to improve OCR. For example, if the panel depicts a character being punched, an action emote in the panel is likely to include one of a short list of words (pow, thwap, bam, etc.). In some embodiments, areas of an image that the prediction module 420 identifies an including text but for which OCR fails are flagged for review by a human operator, who can either indicate there is no text present, provide the depicted text, or provide a translation of the text.

The validation model 430 presents predicted features of an image generated by the prediction module 420 to a user who provides validation information indicating the accuracy of the predicted features. In one embodiment, the validation module 430 presents features of particular interest to the user, such as those with relatively low probabilities of being correct, or those that are considered particularly important (e.g., the identity of the main character). The validation module 430 then prompts the user to confirm the accuracy of the presented predicted features. For example, the validation module 430 might display the input image with an outline surrounding a predicted feature (e.g., a character, panel, or speech bubble) on a screen and provide two controls, one to confirm the prediction as correct and one to indicate that the prediction is incorrect. Thus, the validation information is a binary indication of whether the prediction was correct or incorrect. In other embodiments, the validation module 430 provides further controls to enable the user to provide additional validation information indicating how or why the prediction is incorrect, or provide corrected feature information. For example, in the case of predicting the location of a panel, the validation module 430 might enable the user to "drag and drop" segments of the predicted panel outline to more accurately reflect the panel's location in the image.

The validation module 430 updates the model used to generate the predictions based on the validation information provided by the user. In one embodiment, the validation module 430 uses a backpropagation algorithm and gradient descent method similar to that described above with reference to the training module 410 to update the model. In another embodiment, the validation module 430 provides negative examples (i.e., images confirmed to not include a feature that was previously predicted) to the training module 410, which uses these negative examples for further training. In other words, the training module 410 can also build the model based on images known not to contain certain features.

The predictive model store 440 includes one or more computer-readable storage media that store the predictive models generated by the training module and updated by the validation module 430. In one embodiment, the predictive model store 440 is a hard drive within the graphic novel analysis system 120. In other embodiments, the predictive model store 440 is located elsewhere, such as at a cloud storage facility or as part of the graphic novel corpus 110.

Figure 5:
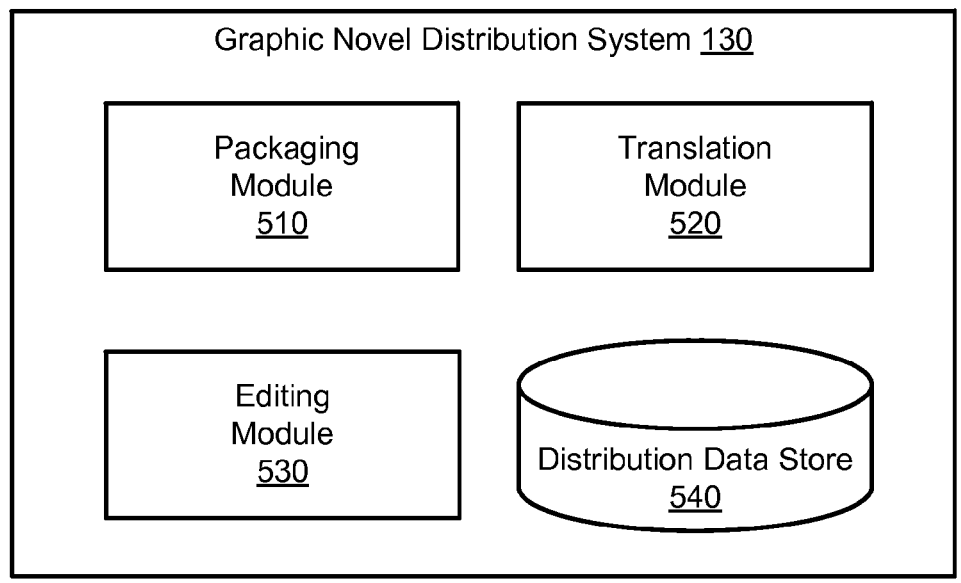
FIG. 5 is a high-level block diagram illustrating one embodiment of the graphic novel distribution system shown in FIG. 1.

FIG. 5 illustrates one embodiment of the graphic novel distribution system 130. As shown, the graphic novel distribution system 130 includes a packaging module 510, a translation module 520, an editing module 530, and a distribution data store 540. Other embodiments of the graphic novel distribution system 130 include different or additional components. In addition, the functions may be distributed among the components in a different manner than described herein. For example, the translation module 520 may be omitted in embodiments where translation is performed by the reading devices 180.

The packaging module 510 creates a packaged digital graphic novel that includes the graphic novel content and presentation metadata based on the analysis performed by the analysis system 120. The presentation metadata is generated from the feature predictions output by the machine-learning model. As described previously, in various embodiments the presentation metadata includes a list of features and corresponding locations and reading orders (where appropriate), specific instructions on how the graphic novel content should be presented, such as pan and zoom instructions, or a combination of both. The presentation metadata also includes text extracted from graphic novel content.

In one embodiment, the packaging module 510 creates a packaged digital graphic novel (e.g., a PDF or fixed layout EPUB file, such as one conforming to the EPUB Region-Based Navigation 1.0 standard) that includes a series of ordered images (e.g., one image per page of the graphic novel) and presentation metadata corresponding to each image. The metadata for a given image identifies the features of that image identified by the digital graphic model analysis system 120 and includes the location and reading order of the panels and speech bubbles. The metadata also includes a plaintext representation of the text included in speech bubbles in the order predicted for the speech bubbles. In another embodiment, the metadata further includes text extracted from portions of the panels that were not predicted to be speech bubble (e.g., text from signs in the images) and an indication of the location of the text in that image. In other embodiments, the features alternately or additionally include characters, moods, weather, objects, artist, author, year or era of publication, and the like.

In a further embodiment, rather than explicitly identifying some or all of the features, the presentation metadata describes how a reader device 180 should present the image. For example, instead of identifying the location and order of speech bubbles, the presentation metadata can describe a set of changes to the zoom level and center of a viewing window such that the user's attention is drawn to the speech bubbles in the desired order. Various methods of presentation are described in detail below, with reference to FIG. 6.

The translation module 520 translates text identified in graphic novel content into other languages. The translation module 520 leverages features identified by the prediction module 420 to improve the translation. In one embodiment, the translation module 520 updates or supplements the presentation metadata to include the translations of the text. Note that in some embodiments, the translation functionality is performed by a reader device 180. In such embodiments, the reader device 180 might store the translated text locally (e.g., in RAM) rather than update the presentation metadata.

In one embodiment, the translation module 520 applies a machine-translation algorithm to the machine-readable text extracted from the speech bubbles. The predicted intended reading order provides contextual information that aids in translation. For example, if a pair of speech bubbles includes a question and answer, the content of the question can inform the translation of the answer, and vice versa. As a specific example of this, if an answer references firing arrows, it is likely that the word "bow" in the question refers to an object for firing arrows, rather than a knotted piece of ribbon. In other embodiments, other predicted features are alternately or additionally used to aid translation. For example, if a particular character is identified in a panel, text in that panel can be translated considering that character's catch phrases and style of speech. In one such embodiment, the machine-translation algorithm(s) used are tailored for translation of one or more of a content including a particular character, content by a particular author, content from a particular publisher, and the like. In another embodiment, an action depicted in a panel is used to aid in translating a visual emote. For example, if the panel depicts a character getting punched, a nearby visual emote can be translated to an appropriate word for the sound of a punch.

In embodiments where the translation module 520 translates non-speech bubble text, the translation module 520 makes similar use of contextual information as described above with reference to speech-bubble text. For example, if text on a sign depicted in a panel is to be translated, the translation module 520 might consider the text in all of the speech bubbles included in that panel as well as other characters and objects depicted. As a more specific example, if a panel depicts a particular character and the text in the speech bubbles references a particular city, then it is more likely that the text on a sign in the panel corresponds to a location within that city than an unrelated location.

In embodiments that include an editing module 530, it provides tools for a user (e.g., an author or publisher) to review and revise the presentation metadata included in the packaged digital graphic novel. In one such embodiment, the editing module 530 provides a browser that enables the user to select and view images in the digital graphic novel along with the corresponding translated text. On user-selection of an image, the browser displays the image with an indication of detected text objects (e.g., speech bubbles). On user-selection of a text object, the editing module 530 displays the translation of the corresponding text and enables the user to edit the translation (e.g., by typing corrections using a keyboard). The presentation metadata is then edited accordingly.

The distribution data store 540 is one or more computer-readable media that store the packaged digital graphic novels. In some embodiments, the distribution data store 540 is located at a server farm that provides functionality for a digital graphic novel distribution system. In one such embodiment, the distribution system recommends digital graphic novels to users based on correlations between the users' interests (e.g., as provided as part of a user profile) and the features of graphic novels identified by the presentation metadata. For example, if the user has a particular interest in one line of digital graphic novels, the distribution system 540 might recommend a digital graphic novel from a different line that includes some of the same characters.

Further to the descriptions above, the user may be provided with controls allowing the user to make an election as to both if and when systems, programs, or features described herein may enable collection of user information (e.g., information about the user's interests, social network, social actions or activities, profession, preferences, current location, and the like). The user may also be provided with controls allowing the user to control whether content or communications are sent from a server (e.g., the graphic novel distribution system 130) to the user's reading device 180. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In one embodiment, the graphic novel distribution system 130 also provides tools for identifying digital graphic novels that infringe copyright. If the machine-learning model incorrectly predicts a digital graphic novel contains a particular character, that may indicate the character actually depicted infringes the copyright in the particular character. For example, if a rival publisher intentionally creates a character almost identical to the particular character, the machine-learning model will likely initially predict it to be the particular character (until the model is updated via feedback, and even then, the two may be hard to distinguish if the copying is particularly blatant). In one embodiment, predictions within a medium range of certainty (e.g., 50% to 70%) are flagged as potential infringement, as this range indicates that there is enough similarity for an identification, but enough of a difference that there is a significant degree of uncertainty in the prediction. The flagged characters are then sent to a human (e.g., an employee of the owner of the copyright that may be infringed) for review. In other embodiments, the distribution system 130 provides other tools for detecting unlicensed translations. For example, an unlicensed translation can be identified by similarities between the text of the unlicensed translation and the text of the official, auto-translated version.

Figure 6:
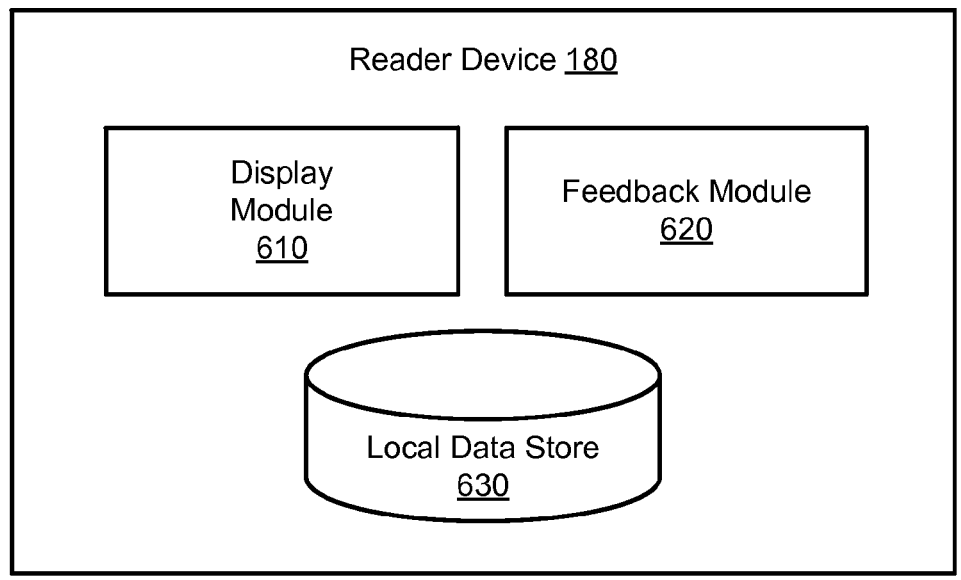
FIG. 6 is a high-level block diagram illustrating one embodiment of a reader device shown in FIG. 1.

FIG. 6 illustrates one embodiment of a reader device 180. As shown, the reader device 180 includes a graphic novel display module 610, a feedback module 620, and a local data store 630. Other embodiments of the reader device 180 include different or additional components. In addition, the functions may be distributed among the components in a different manner than described herein. For example, in some embodiments, the feedback module 620 is omitted.

The display module 610 presents digital graphic novel content to a user based on the presentation metadata with which it was packaged by the packaging module 510. In various embodiments, the presentation metadata indicates the location and order of the panels and speech bubbles on a page as well as the translation of the text in those speech bubbles. The display module 610 presents the panels in the indicated order and replaces the text in the speech bubbles with the translated text. In one such embodiment, the display module 610 initially displays the first panel (as indicated in the presentation metadata) on a screen of the reader device 180. In response to user input (e.g., tapping the screen or selecting a "next panel" icon), the display module 610 determines which panel should be displayed next from the presentation metadata and transitions the display on the screen to that second panel. Each time the user requests to move forward (e.g., by tapping the screen or selecting a "next panel" icon), the display module 610 inspects the presentation metadata to determine which panel should be displayed next and updates the display on the screen accordingly. This method for sequentially presenting the panels allows each panel to be displayed full screen, which is particularly useful with reader devices 180 that have small screens.

When displaying each panel, the display module 610 replaces the original text in the speech bubbles (in the original language) with the translated text (in a different language, e.g., one requested by a user). In various embodiments, the display module "blanks out" speech bubbles by identifying a background color (usually white) and filling the entire speech bubble with the background color. The display module 610 then adds the translated text for the speech bubble included in the presentation metadata to the speech bubble. In one embodiment, the display module 610 uses a default font and size for the added text. In another embodiment, the display module 610 uses a user-selected font (e.g., as selected on a preference screen) and selects a font size such that the translated text substantially fills the speech bubble. In a further embodiment, the display module 610 matches the size and font of the translated text to the original text.

In some embodiments, the display module 610 presents the digital graphic novel according to the location and order of the speech bubbles, as indicated by the presentation metadata. In one such embodiment, the display module 610 displays each speech bubble in the order indicated in the presentation metadata and selects a zoom level that balances readability of the text with providing a sufficient amount of the surrounding imagery to provide context. The display module 610 can select the zoom level used or it can be included in the presentation metadata. The display module 610 proceeds from one speech bubble to the next (as indicated by the presentation metadata) in response to user input (e.g., tapping the screen or selecting a "next speech bubble" control). In another embodiment, the presentation metadata instructs the display module 610 to initially present the whole panel (or page) on the screen and then zoom in on each speech bubble sequentially.

In yet another embodiment, a complete panel or page is displayed on the screen and just the area of the image that corresponds to a selected speech bubble (either based on the sequential order or user selection) is magnified. Initially the display module 610 displays a whole panel with no zooming on the screen. When the reader selects a "next speech bubble" control, an area of the image including the first speech bubble (as indicated by the presentation metadata) is magnified and the reader can navigate through the text in that bubble (e.g., using a scroll bar). However, the remainder of the image that does not include the speech bubble remains unmagnified. Thus, the reader can read the text and obtain the contextual information provided by the remainder of the image in the panel without having to switch between one view and another.

In some embodiments, the display module 610 displays translations of non-speech bubble text (e.g., text included on signs, visual emotes of sound effects, etc.). In one such embodiment, the presentation metadata indicate a portion of a panel that includes the non-speech bubble text. When the user selects that portion (e.g., by tapping on the portion of the screen), the translation of the non-speech bubble text is displayed in conjunction with the original image. For example, the translated text might be displayed in a text bar at the bottom of the screen or in a pop-up bubble that overlays the original image.

In other such embodiments, the display module 610 performs image processing on the image to replace the original non-speech bubble text with the translated text. In one embodiment, the display module 610 identifies properties of the original non-speech bubble text such as a background color, text color, text style, text size, text orientation, text perspective (i.e., orientation relative to the plane of the page), and the like. The display module 610 then "blanks out" the sign in a similar manner as described above with reference to speech bubbles and adds translated text with similar properties (e.g., using the same color, a font similar to the original style, and with the same orientation). One of skill in the art may recognize other manners in which images can be altered to replace non-speech bubble text with translations thereof.

The feedback module 620 provides an interface with which the user can provide feedback regarding the presentation of the digital graphic novel. In various embodiments, the feedback module 620 provides a virtual button on a screen of the display device that the user can select to report a problem with the presentation. For example, if the translated text is nonsensical, inaccurate, clumsy, or otherwise inadequate, the user can press the button and complete a short feedback form describing the problem (e.g., suggesting a better translation). In one such embodiment, the presentation metadata is updated locally so that if the user reads the digital graphic novel again, the user's improved translation is presented (assuming the user provided one). In another such embodiment, the feedback module 620 sends the feedback to an administrator of the graphic novel distribution system 130 for review to determine whether the presentation metadata should be updated system-wide to include a better translation. In yet another embodiment, the feedback is provided to the graphic novel analysis system 120, which uses it to update the machine-translation algorithm that initially provided the translation. In some embodiments, the feedback module 620 crowd-sources translations for portions of text for which either OCR or auto-translation failed. For example, if a region of the image was predicted to contain text, but OCR failed to identify recognizable characters, the feedback module 620 might highlight the portion of the image in question and prompt the user to indicate if text is present, and, if so, provide a translation.

The local data store 630 is one or more computer-readable media that store the software for displaying digital graphic novels, digital graphic novel content, and presentation metadata. In one embodiment, the user downloads packaged digital graphic novels that include the presentation metadata to the local data store 630 from an online marketplace. The presentation module 610 then accesses the packaged digital graphic novel from the local data store 630. In another embodiment, the packaged digital graphic novel is stored remotely (e.g., at a cloud server) and the display module 610 accesses it via the network 170.

Exemplary Methods

Figure 7:
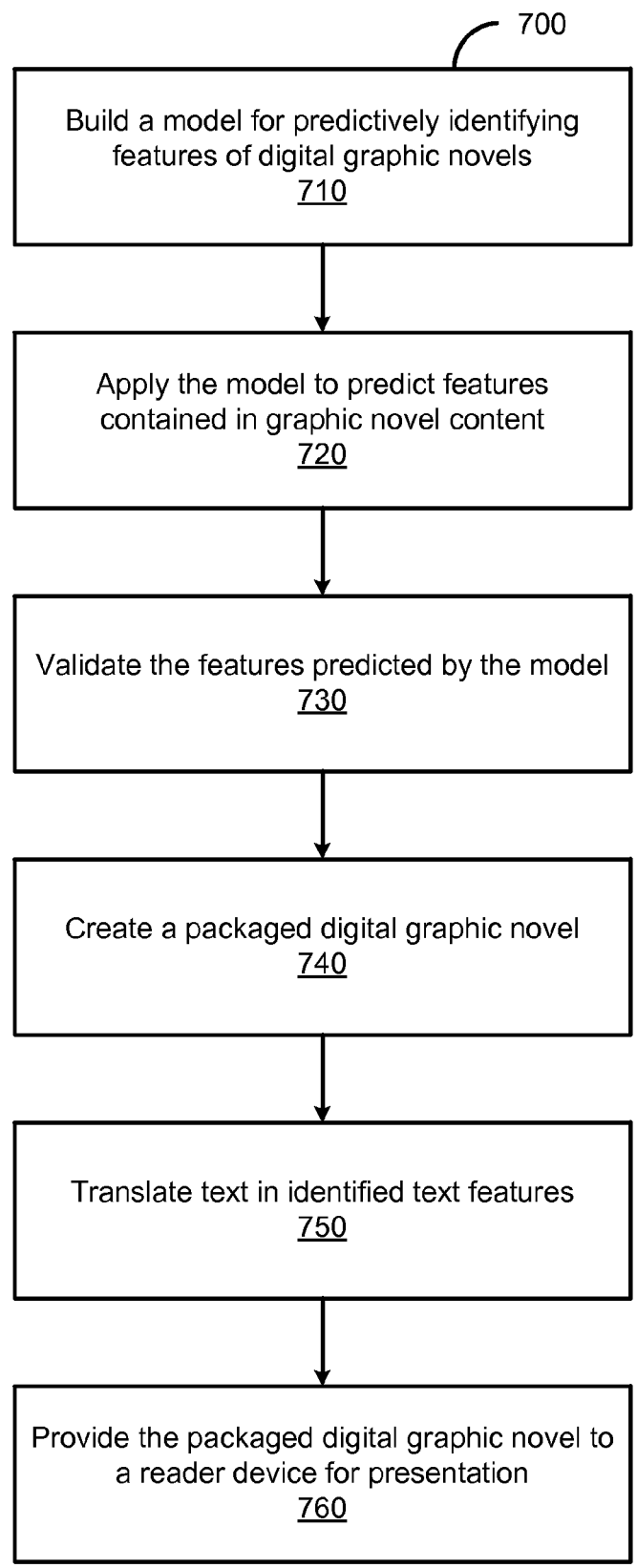
FIG. 7 is a flowchart illustrating a method of providing automatic translation of a digital graphic novel, according to one embodiment.

FIG. 7 illustrates one embodiment of a method 700 of providing a method of providing automatic translation of a digital graphic novel. FIG. 7 attributes the steps of the method 700 to various components of the networked computing environment 100. However, some or all of the steps may be performed by other entities. In addition, some embodiments may perform the steps in parallel, perform the steps in different orders, or perform different steps.

In the embodiment shown in FIG. 7, the method 700 begins with the training module 410 building 710 a model for predictively identifying features of a digital graphic novel. As described previously, the model is initially built 710 in a supervised learning phase during which human operators identify features in a subset of digital graphic novel selected from a corpus 110. One embodiment of a method 800 for building 710 the model is described in detail below, with reference to FIG. 8.

The prediction module 420 applies 720 the model to digital graphic novel content to predict the features contained therein. In one embodiment, the features include the location and order of panels and speech bubbles within the digital graphic novel. In other embodiments, the prediction module 420 identifies different or additional features such as non-speech bubble text, preferred transitions, depicted objects, artist, author, depicted characters, weather, mood, plot lines, themes, advertisements, and the like.

The validation module 430 validates 730 the predictions made by the model based on human review. In one embodiment, the validation 730 is performed as part of the initial training of the model. In another embodiment, validation feedback is crowd-sourced from readers and the model is continuously or periodically updated based on received feedback. For example, the validation module 430 might aggregate crowd-sourced feedback over a one month period and then produce an updated model at the end of the period. One embodiment of a method 900 for validating 730 and updating the model is described in detail below, with reference to FIG. 9.

The packaging module 510 creates 740 a packaged digital graphic novel that includes the graphic novel content and presentation metadata. The presentation metadata is generated by the packaging module 510 based on validated predictions received from the validation module 430 (or predictions received directly from the predictions module 420) and includes untranslated text associated with various features (e.g., speech bubble). In one embodiment, the presentation metadata indicates the location and order of the speech bubbles is each panel, as predicted by the model, as well as the text included in each speech bubble, as determined by an OCR algorithm. As described previously, in other embodiments, the presentation metadata provides specific presentation instructions based on the predictions, or uses a combination of presentation and indicators of the location and nature of features that are further processed by a reader device 180 when displaying the packaged digital graphic novel.

The translation module 520 translates 750 the text of features or sets of features for which the corresponding presentation metadata includes text. As described previously, the location and order of features that include text (e.g., speech bubbles) as well as their proximity to other predicted features (e.g., being included in the same panel as a particular character) provides contextual information that the translation module 520 uses to aid translation. In one embodiment, the translation module 520 identifies all of the speech bubbles in a portion of the packaged digital graphic novel (e.g., a panel, a page, etc.) and compiles the machine-readable text included in the metadata of each speech bubble into a single piece of text in the order indicated by the presentation metadata for the speech bubbles. The translation module 520 then translates the single piece of text as a whole. The translation module 520 then breaks the text back up into segments corresponding to each speech bubble and updates the presentation metadata corresponding to the speech bubbles to either replace or supplement the text with the translated text. For example, the translated text might be appended after the original text surrounded by a tag indicating that it is a translation, and the language into which the text was translated.

The packaged digital graphic novel is provided 760 to a reader devices 180 for presentation in accordance with the manner indicated by the presentation metadata. In one embodiment, the presentation metadata indicates the location and order of panels and speech bubbles, as well as translated text (as generated by the translation module 520) for the speech bubbles. The precise manner in which the digital graphic novel is presented is determined locally by the reader device 180 (e.g., based on user viewing preferences). Thus, different reader devices 180 can present the same digital graphic novel in different ways. In another embodiment, the presentation metadata includes instructions describing the manner in which the digital graphic novel should be presented. Consequently, the reader device 180 presents the digital graphic novel as directed by the presentation metadata.

Figure 8:
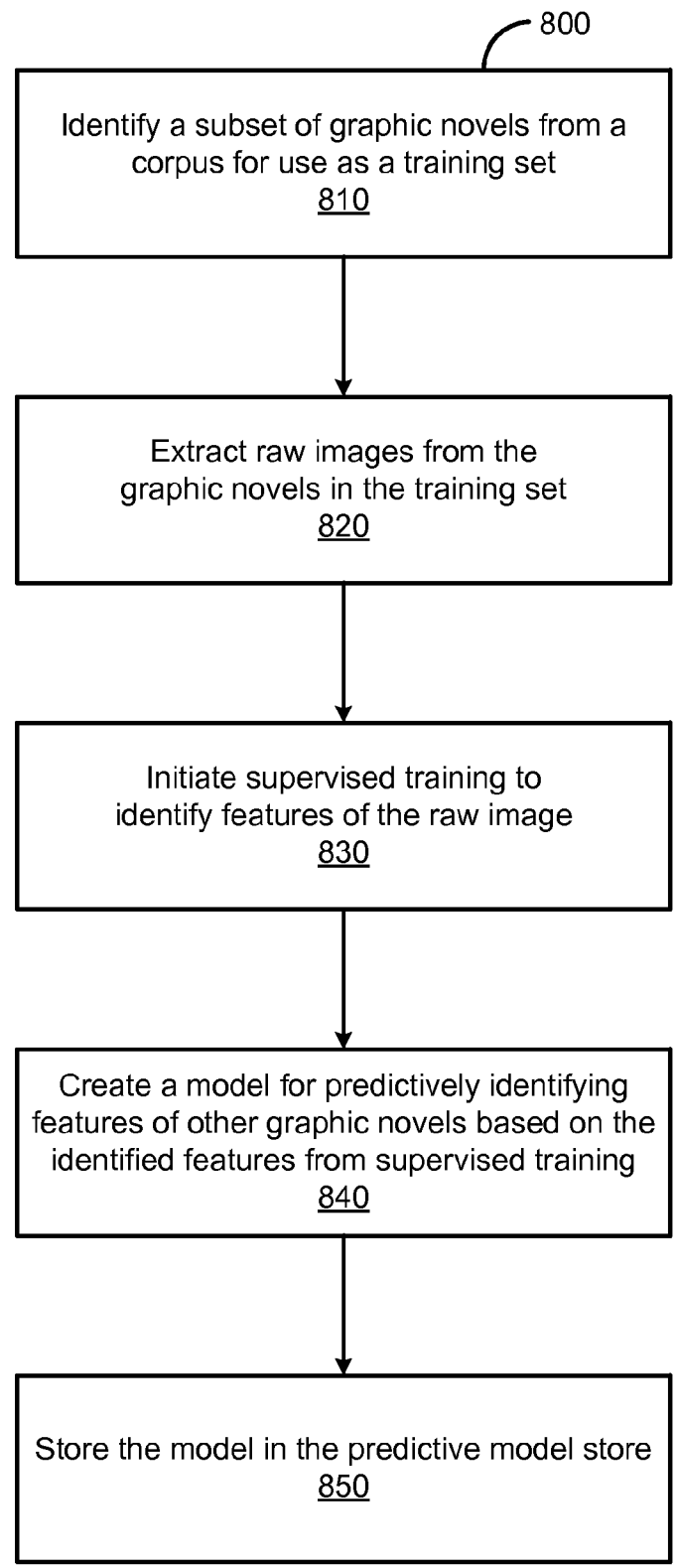
FIG. 8 is a flowchart illustrating a method of building a predictive model for use in the method of FIG. 7, according to one embodiment.

FIG. 8 illustrates one embodiment of a method 800 for building a predictive model. FIG. 8 attributes the steps of the method 800 to the training module 410. However, some or all of the steps may be performed by other entities. In addition, some embodiments may perform the steps in parallel, perform the steps in different orders, or perform different steps.

In the embodiment shown in FIG. 8, the method 800 begins with the training module 410 identifying 810 a subset of digital graphic novels from the corpus 110 to use as a training set. As described above, with reference to FIG. 4, the subset may be selected randomly or chosen to have a desired mix of characteristics (e.g., a range of different publishers and authors, a range of characters, and the like).

Referring back to FIG. 8, the training module 410 extracts 820 the raw images (e.g., corresponding to individual pages) from the digital graphic novels in the training set. In one embodiment, the raw images are processed in preparation for training. For example, the raw images can be resized to have uniform dimensions, and brightness and contrast settings altered to provide uniformity across the training set.

Regardless of any preprocessing performed, the training module 410 initiates 830 a supervised training phase to identify features of the raw images. As described above, with reference to FIG. 4, in the supervised training phase, human operators identify features of the processed images (or the raw image if no processing was performed). Thus, at the conclusion of the supervised training phase, the training module 410 has a set of images, each paired with corresponding metadata indicating the features the image includes.

Based on the training set and corresponding metadata generated during the supervised training phase, the training module 410 creates 840 a model for predictively identifying features of digital graphic novels. In one embodiment, the model is a neural network that predictively identifies the location and order of panels, and the identity of depicted characters. Because the model was built from the training set, when provided with any (or at least most) of the digital graphic novels in the training set, it accurately identifies the panel locations, panel order, and depicted characters. Thus, when the same neural network is applied to a digital graphic novel to which is has not previously been applied, there is a reasonably high probability of successfully identifying the panels and depicted characters. Having successfully created 840 the model, the training module 410 stores 850 it in the predictive model store 440.

Figure 9:
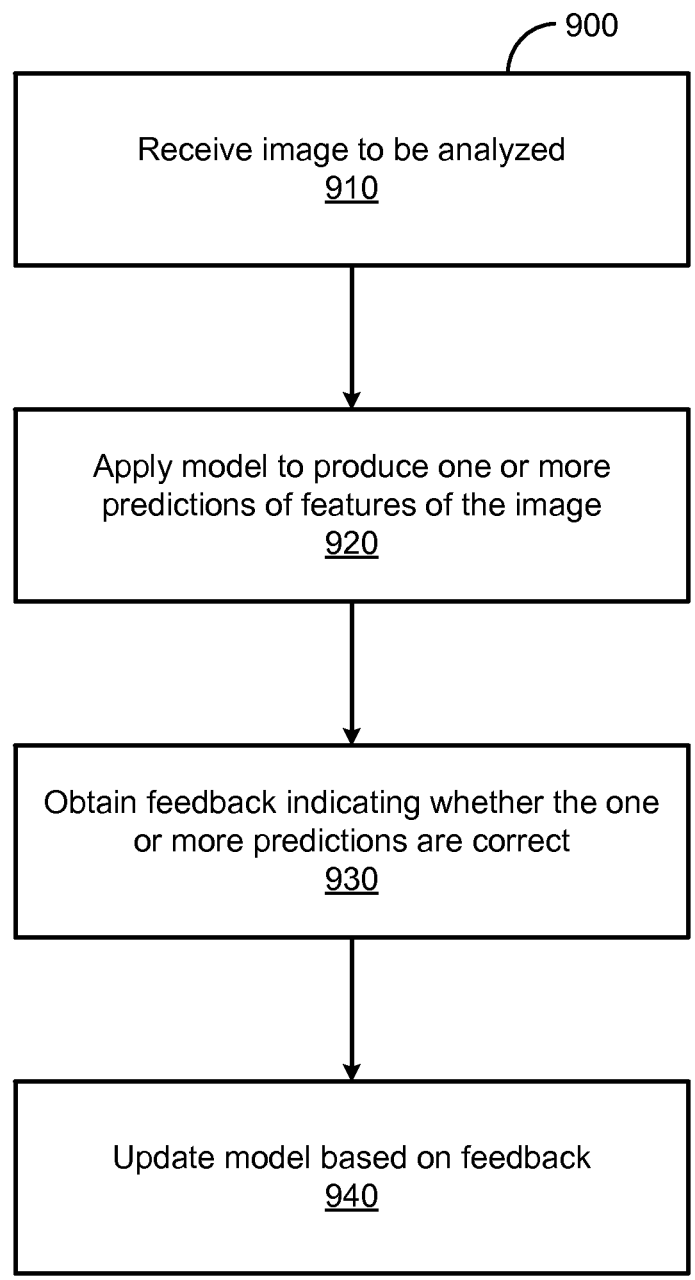
FIG. 9 is a flowchart illustrating a method of validating predictions based on feedback, according to one embodiment.

FIG. 9 illustrates one embodiment of a method 900 of validating predictions based on feedback. FIG. 9 attributes the steps of the method 900 to the prediction module 420 and validation module 430. However, some or all of the steps may be performed by other entities. In addition, some embodiments may perform the steps in parallel, perform the steps in different orders, or perform different steps.

In the embodiment shown in FIG. 9, the method 900 begins with the prediction module 420 receiving 910 an image to be analyzed. The prediction module 420 applies 920 a predictive model to the image (e.g., one generated using the method of FIG. 8) to produce one or more predictions of image features. For the sake of clarity, the remainder of FIG. 9 will be described with reference to an embodiment where the model generates predictions for the locations of panels in the image, the order of the panels, and characters depicted in each panel. In view of the rest of the specification, one of skill in the art will recognize that the model may generate predictions regarding many other features and combinations of features.

The validation module 430 obtains 930 feedback indicating whether the predications made by the prediction module are correct. As described previously, the feedback can either come from operators tasked with training the model during development or crowd-sourced from users after being put into use. In one embodiment, the feedback is binary, either indicating that the prediction is correct or incorrect. In other embodiments, the feedback also includes corrections where the predictions were incorrect. For example, if the predicted location of the frames is incorrect, the feedback can indicate the correct locations of the frames. Similarly, the feedback can provide the correct order for frames. Further, if the model incorrectly identifies a character, the feedback can provide the correct character identification.

Regardless of the specific nature of the feedback obtained 930, the validation module 430 uses it to update 940 the model. As described above with reference to FIG. 4, in one embodiment a backpropagation algorithm employing a gradient descent method is used to update the model. Thus, the accuracy of the predictions generated by the model is improved over time as greater amounts of feedback are accounted for.

Figure 10:
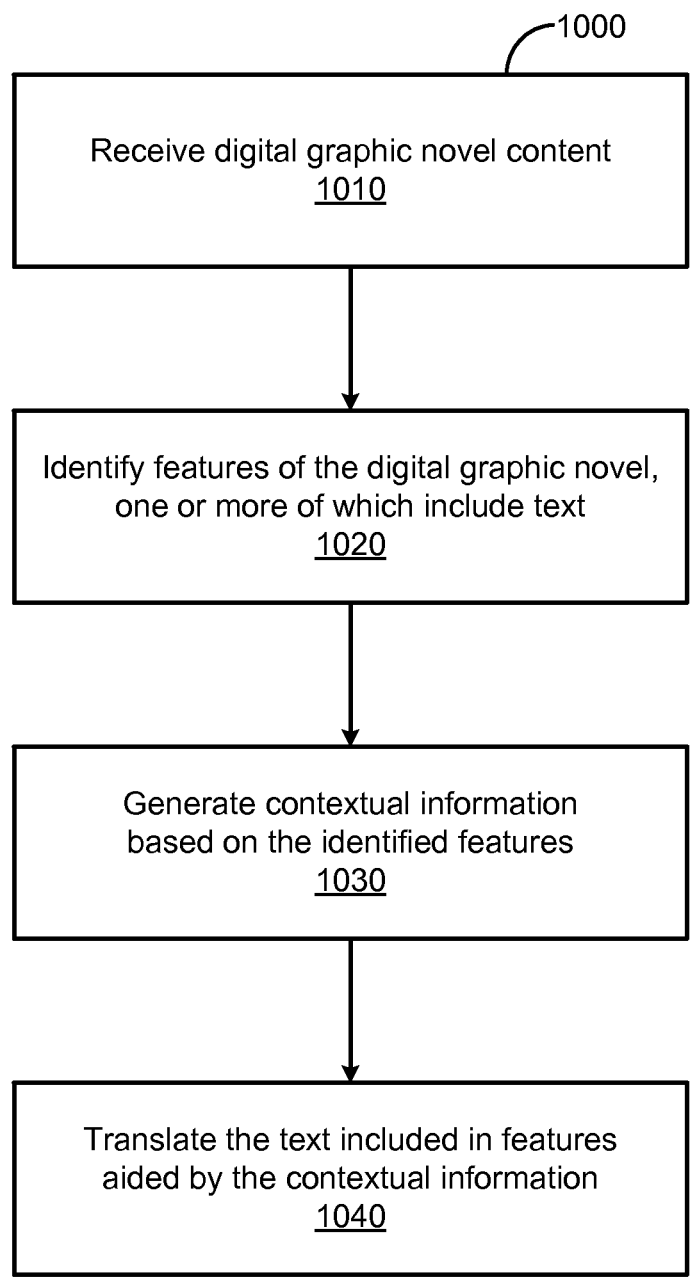
FIG. 10 is a flowchart illustrating a method of using contextual information generated from identified features to aid translation, according to one embodiment.

FIG. 10 illustrates one embodiment of a method 1000 of using contextual information generated from identified features to aid translation. FIG. 10 attributes the steps of the method 1000 to the translation module 520. However, some or all of the steps may be performed by other entities. For example, in some embodiments, the translation is performed by a reader device 180. In addition, some embodiments may perform the steps in parallel, perform the steps in different orders, or perform different steps.

In the embodiment shown in FIG. 10, the method 1000 begins with the translation module 520 receiving 1010 digital graphic novel content. The translation module 520 then identifies 1020 features of the digital graphic novel content. At least one of the identified features includes text. In one embodiment, the translation module 520 identifies 1020 several speech bubbles and the intended reading order of those speech bubbles based on presentation metadata packaged with the digital graphic novel content. Alternatively, application of the machine-learning model (as described previously) occurs as part of the translation process. In a further embodiment, the translation module 410 identifies 1020 a non-speech bubble feature that includes text such as a sign, as described previously.

The translation module 520 generates 1030 contextual information for the feature or features that include text based on the identified features. In one embodiment, the features that include text are speech bubbles, and the contextual information for those speech bubbles is their intended reading order, as indicated in the presentation metadata. In other embodiments, the contextual information includes characters and objects that are identified in the presentation metadata as being depicted in panels of the digital graphic novel near the speech bubbles. In one such embodiment, only features included in the same panel as a speech bubble are considered to provide contextual information for that speech bubble. In other such embodiments, features of other panels within a threshold distance of the panel including the speech bubble contribute to the contextual information (e.g., within three panel before or after the panel including the speech bubble, as indicated by the determined reading order of the panels). In one embodiment, the impact of a given feature as contextual information for the speech bubble is weighted by the proximity of that feature to the speech bubble, with features that are closer to the speech bubble being given greater weight than those that are further away.

In the embodiment shown in FIG. 10, the method 1000 concludes with the translation module 520 translating 1040 the text included in one or more features. In one embodiment, the translation module 520 extracts the text from those features that included text and applies a machine-translation algorithm, which is aided by the contextual information. For example, the translation module 520 can leverage the intended reading order of speech bubbles to improve translation. As described previously, the words and phrases used in one speech bubble can provide clues as to the correct translations of speech bubbles that precede and follow it. As another example, if a speech bubble is included within the same panel as a particular character, a machine-translation algorithm that has been specially tailored to translate dialogue involving that character can be applied. One of skill in the art may recognize other forms of contextual information that may be used to aid in the translation of text.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and process for providing indexed ebook annotations. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein. The scope of the invention is to be limited only by the following claims.

What is claimed is:

1. A computer-implemented method comprising:
    receiving, by at least one processor, digital graphic novel content;
    producing, by at least one processor, a numerical map that represents an image extracted from the digital graphic novel content;
    responsive to inputting the numerical map into a first artificial neural network of a machine learning model configured to determine regions of the digital graphic novel content that are likely to include speech bubbles, receiving, by the at least one processor, from the first artificial neural network, a plurality of candidate regions of the digital graphic novel content that are likely to include speech bubbles; and
    responsive to inputting the plurality of candidate regions into a second artificial neural network of the machine learning model, receiving, by at least one processor, from the second artificial neural network, features of the digital graphic novel content that include a plurality of speech bubbles containing text;
    generating, by at least one processor, based on the features of the digital graphic novel content, contextual information corresponding to the features, the contextual information including the text of the plurality of speech bubbles in an intended reading order of the plurality of speech bubbles; and
    automatically translating, by at least one processor, based at least in part on the contextual information, from a first natural language to a second natural language, the text contained in the plurality of speech bubbles to produce translated text.

2. The computer-implemented method of claim 1 wherein automatically translating the text comprises:
    after extracting the text contained in the plurality of speech bubbles, compiling the text into a single piece of text based on the intended reading order; and
    translating the single piece of text from the first natural language to the second natural language to produce the translated text.

3. The computer-implemented method of claim 1, wherein the contextual information further includes a depicted character or object contained in the digital graphic novel content, and automatically translating the text comprises applying a translation algorithm to the text contained in the plurality of speech bubbles that is tailored for the depicted character or object contained in the digital graphic novel content.

4. The computer-implemented method of claim 1, further comprising:
    creating a packaged digital graphic novel including the digital graphic novel content and presentation metadata, the presentation metadata including the translated text and an indication of the at least one feature of the features of the digital graphic novel to which the translated text corresponds; and
    providing, by the at least one processor, the packaged digital graphic novel to a reader device that is configured to present the digital graphic novel content in a manner in accordance with the presentation metadata.

5. The computer-implemented method of claim 4, wherein the reader device is configured to display the translated text within the plurality of speech bubbles in place of the text contained in the plurality of speech bubbles.

6. The computer-implemented method of claim 1, wherein the contextual information further includes depicted weather contained in the digital graphic novel content, and automatically translating the text comprises applying a translation algorithm to the text contained in the plurality of speech bubbles that is tailored for the depicted weather contained in the digital graphic novel content.

7. The computer-implemented method of claim 1, wherein each of the plurality of candidate regions is a panel of the digital graphic novel content.

8. The computer-implemented method of claim 1, wherein generating the contextual information associated with the features of the digital graphic novel content includes limiting the contextual information to information contained in each panel of the digital graphic novel content that includes the plurality of speech bubbles.

9. The computer-implemented method of claim 1, wherein generating the contextual information associated with the features of the digital graphic novel content includes limiting the contextual information to information depicted in the digital graphic novel content that is within a threshold distance the plurality of speech bubbles.

10. The computer-implemented method of claim 9, wherein automatically translating the text contained in the plurality of speech bubbles to produce translated text comprises weighting portions of the information depicted in the digital graphic novel content by a proximity of that portion to the plurality of speech bubbles.

11. An electronic device comprising:
at least one processor; and a non-transitory computer-readable storage medium storing instructions executable by the at least one processor for:
receiving digital graphic novel content;
producing a numerical map that represents an image extracted from the digital graphic novel content;
responsive to inputting the numerical map into a first artificial neural network of a machine learning model configured to determine regions of the digital graphic novel content that are likely to include speech bubbles, receiving, from the first artificial neural network, a plurality of candidate regions of the digital graphic novel content that are likely to include speech bubbles; and
responsive to in putting the plurality of candidate regions into a second artificial neural network of the machine learning model, receiving, from the second artificial neural network, features of the digital graphic novel content that include a plurality of speech bubbles containing text;
generating, based on the features of the digital graphic novel content, contextual information associated with the features of the digital graphic novel content, the contextual information including the text of the plurality of speech bubbles in an intended reading order of the plurality of speech bubbles; and
automatically translating, based at least in part on the contextual information, from a first natural language to a second natural language, the text contained in the plurality of speech bubbles to produce translated text.

12. The electronic device of claim 11, wherein automatically translating the text comprises:
after extracting the text contained in the plurality of speech bubbles, compiling the text into a single piece of text based on the intended reading order; and
translating the single piece of text from the first natural language to the second natural language to produce the translated text.

13. The electronic device of claim 11, wherein the contextual information further includes a depicted character or object contained in the digital graphic novel content, and automatically translating the text comprises applying a translation algorithm to the text contained in the plurality of speech bubbles that is tailored for the depicted character or object contained in the digital graphic novel content.

14. The electronic device of claim 11, wherein the executable computer program code further includes instructions for:
creating a packaged digital graphic novel including the digital graphic novel content and presentation metadata, the presentation metadata including the translated text and an indication of the at least one feature of the features of the digital graphic novel to which the translated text corresponds; and
providing, by the at least one processor, the packaged digital graphic novel to a reader device that is configured to present the digital graphic novel content in a manner in accordance with the presentation metadata.

15. A non-transitory computer-readable storage medium storing for instructions executable by at least one processor for:
receiving digital graphic novel content;
producing, a numerical map that represents an image extracted from the digital graphic novel content;
responsive to inputting the numerical map into a first artificial neural network of a machine learning model configured to determine regions of the digital graphic novel content that are likely to include speech bubbles, receiving, from the first artificial neural network, a plurality of candidate regions of the digital graphic novel content that are likely to include speech bubbles; and
responsive to inputting the plurality of candidate regions into a second artificial neural network of the machine learning model, receiving, from the second artificial neural network, features of the digital graphic novel content that include a plurality of speech bubbles containing text;
generating, based on the identified features of the digital graphic novel content, contextual information associated with the features of the digital graphic novel content, the contextual information including the text of the plurality of speech bubbles in an intended reading order of the plurality of speech bubbles; and
automatically translating, based at least in part on the contextual information, from a first natural language to a second natural language, the text contained in the plurality of speech bubbles to produce translated text.

16. The non-transitory computer-readable storage medium of claim 15, wherein automatically translating the text comprises:
after extracting the text contained in the plurality of speech bubbles, compiling the text into a single piece of text based on the intended reading order; and
translating the single piece of text from the first natural language to the second natural language to produce the translated text.

17. The non-transitory computer-readable storage medium of claim 16, wherein the contextual information further includes a depicted character or object contained in the digital graphic novel content, and automatically translating the text comprises applying a translation algorithm to the text contained in the plurality of speech bubbles that is tailored for the depicted character or object contained in the digital graphic novel content.

18. The non-transitory computer-readable storage medium of claim 15, wherein the executable computer program code further comprises instruction for:
creating a packaged digital graphic novel including the digital graphic novel content and presentation metadata, the presentation metadata including the translated text and an indication of the at least one feature of the features of the digital graphic novel to which the translated text corresponds; and
providing, by the at least one processor, the packaged digital graphic novel to a reader device that is configured to present the digital graphic novel content in a manner in accordance with the presentation metadata.

19. The non-transitory computer-readable storage medium of claim 18, wherein the reader device is configured to display the translated text within the plurality of speech bubbles in place of the text contained in the plurality of speech bubbles.

\* \* \* \* \*